US008354011B2

(12) United States Patent (10) Patent No.: US 8,354,011 B2
Elangovan et al. (45) Date of Patent: *Jan. 15, 2013

(54) EFFICIENT REVERSIBLE ELECTRODES FOR SOLID OXIDE ELECTROLYZER CELLS

(75) Inventors: S. Elangovan, South Jordan, UT (US); Joseph J. Hartvigsen, Kaysville, UT (US); Feng Zhao, Salt Lake City, UT (US)

(73) Assignee: Ceramatec, Inc., Salt Lake City, UT (US)

(*) Notice: Subject to any disclaimer, the term of this patent is extended or adjusted under 35 U.S.C. 154(b) by 165 days.

This patent is subject to a terminal disclaimer.

(21) Appl. No.: 12/950,120

(22) Filed: Nov. 19, 2010

(65) Prior Publication Data

US 2011/0062017 A1 Mar. 17, 2011

Related U.S. Application Data

(63) Continuation-in-part of application No. 11/781,718, filed on Jul. 23, 2007, now Pat. No. 7,976,686.

(60) Provisional application No. 60/820,103, filed on Jul. 22, 2006.

(51) Int. Cl.
*C25B 9/08* (2006.01)
*C25B 9/10* (2006.01)
*C25B 11/06* (2006.01)
*H01M 8/10* (2006.01)
*H01M 4/90* (2006.01)

(52) U.S. Cl. ........ 204/266; 204/252; 204/263; 429/479; 429/483; 429/484; 429/486; 429/488; 429/489; 429/523; 429/528; 429/529

(58) Field of Classification Search .................. 204/252, 204/263, 266, 291; 429/479, 483, 484, 486, 429/488, 489, 523, 528, 529

See application file for complete search history.

(56) References Cited

U.S. PATENT DOCUMENTS

| | | | |
|---|---|---|---|
| 3,922,204 A | 11/1975 | Tseung et al. | |
| 5,380,692 A * | 1/1995 | Nakatsuji et al. | 502/303 |
| 5,670,270 A | 9/1997 | Wallin | |
| 5,937,264 A | 8/1999 | Wallin | |
| 5,993,986 A | 11/1999 | Wallin et al. | |
| 6,017,647 A | 1/2000 | Wallin | |
| 6,060,420 A | 5/2000 | Munakata et al. | |
| 6,099,985 A | 8/2000 | Elangovan et al. | |
| 6,117,582 A | 9/2000 | Wallin et al. | |
| 6,319,626 B1 | 11/2001 | Wallin et al. | |
| 6,548,203 B2 | 4/2003 | Wallin et al. | |
| 6,946,213 B2 | 9/2005 | Seabaugh et al. | |
| 7,976,686 B2 * | 7/2011 | Elangovan et al. | 204/252 |
| 2004/0089540 A1 * | 5/2004 | Van Heuveln et al. | 204/293 |
| 2005/0053812 A1 | 3/2005 | Hickey et al. | |
| 2005/0214612 A1 | 9/2005 | Visco et al. | |
| 2006/0216575 A1 * | 9/2006 | Cassidy | 429/40 |
| 2008/0029388 A1 | 2/2008 | Elangovan et al. | |

FOREIGN PATENT DOCUMENTS

EP 1643013 4/2006

OTHER PUBLICATIONS

Bell, Bruce F., "Final Office Action", U.S. Appl. No. 11/781,718, (Nov. 9, 2010), 1-10.
Bell, Bruce F., "Non-Final Office Action", U.S. Appl. No. 11/781,718, (May 11, 2010), 1-9.
Bell, Bruce F., "Notice of Allowance", U.S. Appl. No. 11/781,718, (Feb. 22, 2011),1-5.
Erdle E. et al., "Reversibility and Polarization Behaviour of High Temperature Solid Oxide Electrochemical Cells", *Hydrogen energy process VIII : proceedings of the 8th World Hydrogen Energy Conference*, Honolulu and Waikoloa, Hawaiii, U.S.A., Jul. 22-27, 1990, 415-222.
Hino, Ryutaro et al., "Study on hydrogen production by high temperature electrolysis of steam", *Japan Atomic Energy Research Institute*, JAERI-Research 97-064,(Sep. 1997),1-48.
Hyoda, et al., "Oxygen Reduction Activities of Praseodyimium Manganites in Alkaline solution", *Journal of the Ceramic Society of Japan*105 [5], (1997),412-417.
Marina, O.A. et al., "Electrode Performance in Reversible Solid Oxide Fuel Cells", *Journal of the Electrochemical Society*, 154 (5) B452-B459 (2007), (Mar. 22, 2007), 452-459.
Maskalick, N. J., "High Temperature Electrolysis Cell Performance Characterization", *Int. J. Hydrogen Energy.*, vol. 11, No. 9,(1986),563-570.
Miura, et al., "Kinetics of Cathodic Oxygen Reduction of Lanthanium-Based Perovskite-Type Oxides", (1985),644-649.
Technology Managment Inc., "Low cost, high efficiency reversible fuel cell (and electrolyzer) systems", *Proceedings of the 2001 DOE Hydrogen Program Review*, NREL/CP-570-30535 (also available as NREL/CP-610-30535),(Sep. 2001),Cover, vi, 583-590.
Yamazoe, et al., "Mn-Based Perovskile-Type Oxides as Axygen Reduction Electrode Catalyst for Meta-Air Batteries", *Department of Molecular and Material Sciences, Kyusha University*, (2000),159-168.
Yuan, Dah-Wei "International Search Report", (Aug. 18, 2008),1-2.
Yuan, Dah-Wei "Written Opinion of the International Searching Authority", (Aug. 18, 2008),1-5.

(Continued)

*Primary Examiner* — Bruce Bell
(74) *Attorney, Agent, or Firm* — David Fonda

(57) ABSTRACT

An electrolyzer cell is disclosed which includes a cathode to reduce an oxygen-containing molecule, such as $H_2O$, $CO_2$, or a combination thereof, to produce an oxygen ion and a fuel molecule, such as $H_2$, CO, or a combination thereof. An electrolyte is coupled to the cathode to transport the oxygen ion to an anode. The anode is coupled to the electrolyte to receive the oxygen ion and produce oxygen gas therewith. In one embodiment, the anode may be fabricated to include an electron-conducting phase having a perovskite crystalline structure or structure similar thereto. This perovskite may have a chemical formula of substantially $(Pr_{(1-x)}La_x)(z-y)A'_yBO(3-\partial)$, wherein $0<x<1$, $0 \leq y \leq 0.5$, and $0.8 \leq z \leq 1.1$. In another embodiment, the cathode includes an electron-conducting phase that contains nickel oxide intermixed with magnesium oxide.

25 Claims, 7 Drawing Sheets

OTHER PUBLICATIONS

Yuasa, et al., "Activity and Stability of Gas Diffusion-Type Oxygen Electrode Loaded with Lanthanium Manganites in Strongly Aklanine Electrolytic Bath", *Department of Molecular and Material Sciences, Kyushu University*, (Mar. 2000),118-121.

Battistig, Marcello "European Search Report", EP App. No. 07810715.8 (Corresponding to U.S. Appl. No. 11/781,718, (Nov. 9, 2009),1-5.

Yang, Kyung S., "International Search Report", PCT application No. 2011061039 (Corresponding to U.S. Appl. No. 12/950,120, (Jun. 28, 2012),1-3.

Yang, Kyung S., "Written Opinion of the International Searching Authority", PCT application No. 2011061039 (Corresponding to U.S. Appl. No. 12/950,120, (Jun. 28, 2012),1-3.

Fukio, Takehisa et al., "Abstract: Effect of Yttria-Stabilized Zirconia (YSZ) Addition to Solid Oxide Fuel Cell electrodes on Electrical Performance", *Chemical Abstracts Service*, Columbus, OH, 1991, XP002543620 retrieved from STN database accession No. 116:155360 & JFCC Review, 3, 19-26 Coden: JEFREEX; ISSN: 0916-4553; 1991.,1.

Battistig, Marcello "Communication Pursuant to Article 94(3) EPC", EP App. No. 07810715.8 (Corresponding to U.S. Appl. No. 11/781,718, (Feb. 9, 2011),1-4.

Battistig, Marcello "Communication Pursuant to Article 94(3) EPC", EP App. No. 07810715.8 (Corresponding to U.S. Appl. No. 11/781,718, (Apr. 7, 2010),1.

* cited by examiner

US 8,354,011 B2

EFFICIENT REVERSIBLE ELECTRODES FOR SOLID OXIDE ELECTROLYZER CELLS

RELATED APPLICATIONS

This application is a continuation-in-part of U.S. patent application Ser. No. 11/781,718 filed on Jul. 23, 2007 now U.S. Pat. No. 7,976,686 entitled EFFICIENT REVERSIBLE ELECTRODES FOR SOLID OXIDE ELECTROLYZER CELLS, which in turn, claims the benefit of U.S. Provisional Patent No. 60/820,103 filed on Jul. 22, 2006 entitled ELECTRODES FOR SOLID OXIDE ELECTROLZER CELLS. These prior applications are hereby incorporated herein by reference.

GOVERNMENT RIGHTS

This invention was made in part with government support under grant number DE-AC07-05ID14517 awarded by the United States Department of Energy and the Office of Naval Research under contract number N00014-09-C-0441. The Government has certain rights in the invention.

BACKGROUND OF THE INVENTION

1. Field of the Invention

This invention relates to electrolyzer cells and more particularly to reversible electrodes for solid oxide electrolyzer cells.

2. Description of the Related Art

Fuel cells are expected to play an important role in ensuring our energy security and may be an important component to establishing a "hydrogen economy." Recent efforts have been dedicated to developing and implementing a commercially viable hydrogen fuel cell technology to power cars, trucks, homes, businesses, and the like, in order to reduce dependence on foreign sources of oil. Fuel cells also have the potential to reduce or eliminate harmful emissions generated by conventional power sources such as internal combustion engines.

Unlike many hydrocarbons, molecular hydrogen is not available in centralized natural reservoirs. Moreover, the present infrastructure for production, storage, and delivery of hydrogen is currently vastly inadequate to support a hydrogen economy. Transition to hydrogen use would require altering current industrial and transportation practices on an enormous scale.

Due to the expense and problems associated with hydrogen storage and transportation, some have advocated a more distributed approach to hydrogen production. For example, small regional plants, local filling stations, or even home-based generators could be used to produce hydrogen using energy provided through the electrical distribution grid. While this may lower generation efficiency compared to a centralized generation approach, it may increase overall efficiency when considering all the costs and energy requirements needed to deliver hydrogen to the end user.

Currently, a "reversible" fuel cell offers one potential solution for generating both electricity and hydrogen (or synthesis gas) using a single device. A reversible fuel cell may be used to generate electricity, when operated in fuel cell mode, and hydrogen (or synthesis gas) when operated in electrolysis mode. A reversible fuel cell can be used to produce electricity as needed but may also utilize excess capacity of the electrical grid during off-peak hours to produce hydrogen fuel. This fuel may be used at a later time during periods of high electrical demand or to power a vehicle or other device. A reversible fuel cell also has the potential to reduce costs significantly by converting electricity to hydrogen and hydrogen to electricity using a single device. Nevertheless, to achieve commercial success, the reversible cell must produce hydrogen with enough efficiency to be competitive with other means of production.

While various studies have shown that reversible fuel cells are feasible, it has also been shown that electrodes that perform well in fuel cell mode typically do not perform as well in electrolysis mode, and vice versa. For example, one study demonstrated that a solid oxide fuel cell (SOFC) comprising a negative electrode containing Ni and YSZ and a positive electrode containing LSM significantly outperformed a solid oxide electrolyzer cell (SOEC) using the same electrode materials. In contrast, an SOEC with a platinum negative electrode and an LSCo-containing positive electrode showed lower polarization losses than an SOFC using the same electrode materials. Yet another study demonstrated that, using typical SOFC materials, polarization losses during electrolysis operation were greater than those for fuel cell operation for both electrodes. This study also demonstrated that the polarization increase at reduced temperature was greater in electrolysis mode than in fuel cell mode.

In view of the foregoing, what is needed are electrodes that perform equally well in both fuel cell and electrolysis modes. Such electrodes may be used to provide a reversible fuel/electrolyzer cell which is efficient in either mode of operation. Ideally, the electrodes would exhibit similar polarization and other characteristics in both fuel cell and electrolysis modes of operation.

SUMMARY OF THE INVENTION

The present invention has been developed in response to the present state of the art, and in particular, in response to the problems and needs in the art that have not yet been fully solved by currently available electrolyzer electrodes.

Consistent with the foregoing and in accordance with the invention as embodied and broadly described herein, an electrolyzer cell is disclosed in one embodiment of the invention as including a cathode to reduce an oxygen-containing molecule, such as $H2O$, $CO2$, or a combination thereof, to produce an oxygen ion and a fuel molecule, such as $H2$, $CO$, or a combination thereof. An electrolyte is coupled to the cathode to transport the oxygen ion to an anode. The anode is coupled to the electrolyte to receive the oxygen ion and produce oxygen gas therewith. The anode may be fabricated to include an electron-conducting phase having a perovskite crystalline structure or structure similar thereto. This perovskite may have a chemical formula of substantially $(Pr_{(1-x)}D_x)_{(z-y)}Ny BO_{(3-\partial)}$, wherein $0 < x < 1$, $0 \leq y \leq 0.5$, and $0.8 \leq z \leq 1.1$. Because x is greater than zero but less than one, the formula $(Pr(1-x)Dx)$ means that both Pr and D will be present in the composition. In one embodiment, $0 \leq x \leq 1$, $0 \leq y \leq 0.5$, $0.8 \leq z \leq 1.1$ and D is La.

In selected embodiments, the anode further includes an ion-conducting phase intermingled with the electron-conducting phase. The ion-conducting phase may include one or more oxides. For example, in selected embodiments, the oxide may include zirconia doped with one or more of yttrium oxide, ytterbium oxide, calcium oxide, magnesium oxide, scandium oxide, cerium oxide, or the like. In other embodiments, the oxide may include ceria doped with one or more of yttrium oxide, ytterbium oxide, calcium oxide, magnesium oxide, scandium oxide, zirconium oxide, or the like.

In certain embodiments, the anode may be designed with a selected porosity to allow gas to pass therethrough. To further improve the electrochemical efficiency, the pores of the anode may be infiltrated with an electrocatalyst, such as praseodymium, cobalt, cerium, europium, other rare earth elements, and combinations thereof.

In the chemical equation above, "A'" may include one or more alkaline earth metal, such as calcium, strontium, or the like. Similarly, "B" may include one or more transition metals, such as manganese, cobalt, iron, or the like.

In another aspect of the invention, an electrolyzer cell in accordance with the invention may include a cathode to reduce an oxygen-containing molecule, such as $H_2O$, $CO_2$, or combinations thereof, to produce an oxygen ion and a fuel molecule, such as $H_2$, CO, or combinations thereof. The cathode may include an electron-conducting phase that contains nickel oxide intermixed with magnesium oxide. This nickel oxide may be reduced to nickel upon operating the electrolyzer cell. The magnesium oxide reduces coarsening of the nickel oxide to maintain the nickel's surface area and to maintain conductivity with adjacent particles. An electrolyte is coupled to the cathode to transport the oxygen ion from the cathode. An anode is coupled to the electrolyte to receive the oxygen ion and produce oxygen gas therewith.

In selected embodiments, the molar ratio of nickel oxide to magnesium oxide is greater than or equal to three. The cathode may further include an ion-conducting phase intermixed with the electron-conducting phase. This ion-conducting phase may include one or more oxides. For example, the oxide may include zirconia doped with one or more of yttrium oxide, ytterbium oxide, calcium oxide, magnesium oxide, scandium oxide, or the like. In other embodiments, the oxide may include ceria doped with one or more of samarium oxide, gadolinium oxide, yttrium oxide, ytterbium oxide, calcium oxide, magnesium oxide, scandium oxide, or the like.

In certain embodiments, the cathode may be designed to have a selected porosity to allow gas to pass therethrough. To improve the electrochemical efficiency, the pores of the cathode may be infiltrated with an electrocatalyst, such as praseodymium, cobalt, cerium, europium, other rare earth elements, and combinations thereof.

The present invention relates to improved electrodes for reversible fuel/electrolyzer cells. The features and advantages of the present invention will become more fully apparent from the following description and appended claims, or may be learned by practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts may be designated by like numerals throughout.

Figure 1:
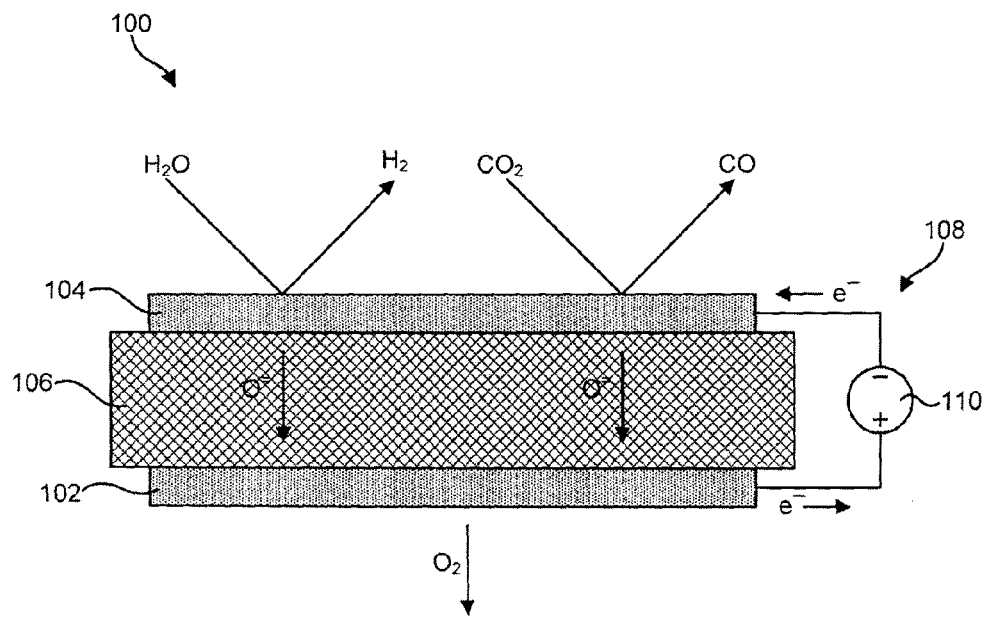
FIG. 1 is a high-level block diagram of one embodiment of an electrolyzer cell in accordance with the invention.

Referring to FIG. 1, in general, a solid oxide electrolyzer cell 100 (which may also, in selected embodiments, function as a fuel cell 100 when the current direction is reversed) may include an anode 102, a cathode 104, and an electrolyte layer 106. Each of the layers 102, 104, 106 may, in selected embodiments, be composed of solid-state ceramic materials.

In general, the anode 102 and cathode 104 may be composed of a material that is both electronically and ionically conductive. The electrolyte, on the other hand, may be composed of a material that is ionically conductive but electronically insulating. Thus, electrons flowing between the anode 102 and cathode 104 may need to flow through an external path 108 or circuit 108 in order to bypass the electrolyte 106. The electrolyte layer 106 may be composed of one or more known ionically-conductive but electrically-insulating ceramic materials such as, for example, yttria stabilized zirconia (YSZ), scandia stabilized zirconia (ScSZ), or lanthanum strontium magnesium gallate (LSGM).

When operating in electrolysis mode, oxygen-containing molecules, such as $H_2O$ or $CO_2$, may be received at the cathode 104, where they may react to generate a fuel, such as $H_2$, CO, or a mixture thereof. Electrons flowing from an external power source 110 may be consumed by this reaction. Similarly, negatively charged oxygen ions may be liberated by this reaction. These oxygen ions may be conducted through the electrolyte layer 106 to the anode 102, where they may react to form oxygen molecules. The reaction at the anode 102 may release electrons, which may in turn flow through the pathway 108 or circuit 108.

As mentioned, electrodes that perform well in fuel cell mode typically do not perform as well in electrolysis mode, and vice versa. For example, electrodes used in many fuel cells exhibit unacceptably high polarization losses when operated in electrolysis mode. This reduces the desirability of using the cell in electrolysis mode because it is inefficient and may not be competitive with other means of producing hydrogen (or carbon monoxide). Thus, it would be desirable to provide electrodes that perform equally well in both fuel cell and electrolysis modes.

Figure 2A:
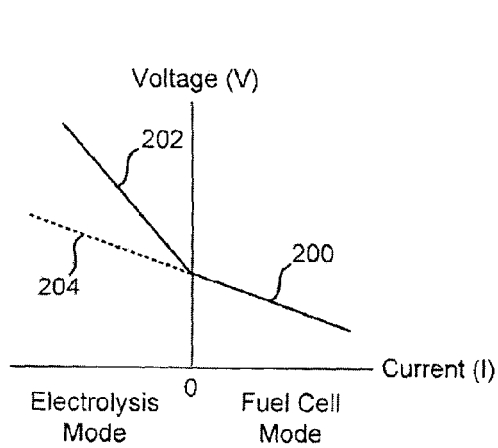
FIG. 2A is a graph showing desired voltage/current characteristics of a cell when operated in fuel cell and electrolysis modes.

For example, as illustrated in FIG. 2A, in fuel cell mode, the voltage across a typical fuel cell will drop as current conducted through the fuel cell increases. This may be observed from the downward slope of the trace 200, which is an indicator of the cell's internal resistance, or polarization. When operated in electrolysis mode, however, a disproportionately larger voltage is needed to produce a roughly equal increase in current through the cell. This may be observed from the steeper slope of the trace 202, which is indicative of the higher resistance, or polarization, of many conventional fuel cells when operated in electrolysis mode. Ideally, the resistance of the cell (and thus the slope of the traces 200, 202) is minimized in both fuel cell and electrolysis modes, with the resistance in electrolysis mode ideally being roughly equivalent to the resistance in fuel cell mode. Thus, the slope of the trace 202 in electrolysis mode will ideally be roughly equal to the slope of the trace 200 in fuel cell mode, as indicated by the dotted line 204, with each slope being minimized as much as possible.

Figure 2B:
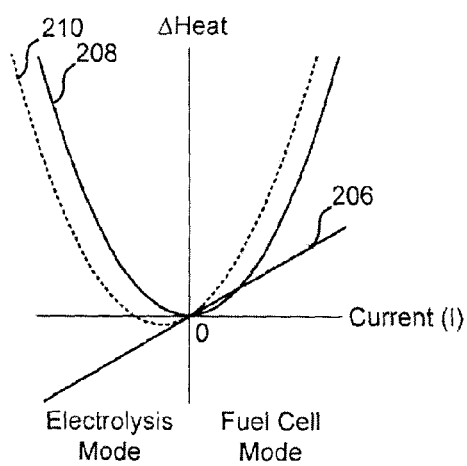
FIG. 2B is a graph showing the heat generated by a cell when operated in fuel cell and electrolysis modes.

Referring to FIG. 2B, determining whether electrodes 102, 104 behave in a manner consistent with the ideal slope 204 illustrated in FIG. 2A may be challenging because the resistance of a cell may vary with temperature. This problem may be compounded by the fact that conversion of $H_2$ and/or CO to $H_2O$ and/or $CO_2$ (fuel cell mode) is exothermic, whereas conversion of $H_2O$ and/or $CO_2$ to $H_2$ and/or CO (electrolysis mode) is endothermic. Thus, the fuel cell reaction generates heat whereas the electrolysis reaction absorbs heat, as represented by the linear curve 206.

On the other hand, heat generated by resistive losses (i.e., $I^2R$) due to the flow of current may be roughly equal for current flowing in either direction through the cell, as represented by the curve 208. The two curves 206, 208 may be added together to provide a resultant curve 210. As shown by the resultant curve 210, a cell operating in electrolysis mode will initially cool but then begin to heat up once the heat from resistive losses is greater than the heat absorbed by the reaction. This concept becomes important when interpreting the test data illustrated in FIG. 5.

Referring again to FIG. 1, in selected embodiments, an electrolyzer cell 100 that operates with substantially equal efficiency in both fuel cell mode and electrolyzer mode may include an anode 102 containing an electron-conducting phase intermingled with an ion-conducting phase. The electron-conducting phase may include a perovskite generally represented by the chemical formula $ABO_3$, wherein "A" and "B" represent A- and B-site cations. The A-site cations may be represented generally by the formula $(Pr_{(1-x)}La_x)_{(z-y)}A'_y$, wherein $0<x<1$, $0 \leq y \leq 0.5$, and $0.8 \leq z \leq 1.1$, and A' represents one or more alkaline earth metals, such as calcium and strontium. The alkaline earth metals may create defects in the crystalline structure of the perovskite to improve its electronic conductivity.

In one embodiment, $0.05 \leq x \leq 0.95$. In some embodiments, the "y" value of $A'_y$ may be 0 such that there is no A' such as Sr or Ca. One example of perovskite may have a chemical formula of substantially $(Pr_{0.2}La_{0.8})Co_{0.8}Fe_{0.2}O_{(3-\partial)}$. In further embodiments, La can be replaced by barium (Ba) or a La—Ba mixture.

The B-site cations may include one or more transition metals, such as manganese, cobalt, iron, or combinations thereof. The B also may be Fe, Co, Ni, Mn, Cr, Ti, Cu or mixtures thereof. The $\partial$ may refer to the oxygen non-stoichiometry which may depend on the crystalline chemistry and electro-neutrality conditions. Suitable materials for the electron-conducting phase may be represented generally by the formula $(Pr_{(1-x)}La_x)_{(z-y)}A'_yBO_{(3-\partial)}$ and may include, for example, $(Pr_{(1-x)}La_x)_{(z-y)}Sr_yMnO_{(3-\partial)}$, $(Pr_{(1-x)}La_x)_{(z-y)}Sr_yFeO_{(3-\partial)}$, and $(Pr_{(1-x)}La_x)_{(z-y)}Sr_yCoO_{(3-\partial)}$.

As noted above, the perovskite may have the La replaced with Ba or a Ba mixture. This particular perovskite will thus have a chemical formula of substantially $(Pr_{(1-x)}D_x)_{(z-y)}A'_yBO_{(3-\partial)}$, wherein $0<x<1$, $0 \leq y \leq 0.5$, and $0.8 \leq z \leq 1.1$ in which the A', B, x, y, z, and $\partial$ all have the same values/elements as described herein. However, the "D" element may be selected from the group consisting of La, Ba, or a Ba—La mixture.

The ion-conducting phase may include one or more oxides. For example, the ion-conducting phase may include zirconia doped with one or more of yttrium oxide, ytterbium oxide, calcium oxide, magnesium oxide, scandium oxide, cerium oxide, or the like. In other embodiments, the ion-conducting phase may include ceria by itself or doped with one or more of yttrium oxide, ytterbium oxide, calcium oxide, magnesium oxide, scandium oxide, zirconium oxide, or the like. One advantage of ceria is that it is both electronically and ionically conductive, with much better ionic conductivity than zirconia. The enhanced ionic conductivity is at least partly due to the fact that oxygen is less firmly attached to the ceria molecule than it is with zirconia, providing improved oxygen conductivity and better electrochemical performance.

As shown by the chemical formula above, the molar concentration of praseodymium (Pr) may, in some embodiments, equal, exceed, or completely replace lanthanum (La), a common material in conventional electrodes. Lanthanum and zirconia are known to react to form the insulating product lanthanum zirconate, which may accumulate between the ion and electron-conducting phases and increase the resistance of the electrode over time. To reduce this problem, praseodymium, an element which reacts with zirconia to produce a less insulating praseodymium zirconate, may be used (in some embodiments) to replace all or part of the lanthanum.

In selected embodiments, the anode 102 may also be infiltrated with an electrocatalyst such as praseodymium, cobalt, cerium, europium, or other rare earth elements or combinations thereof. The anode 102 may be fabricated to have a desired porosity, such as, for example, between about ten and twenty percent porosity by volume. These pores may be infiltrated with the electrocatalyst to increase the catalytic activity of the anode 102.

In certain embodiments, the anode 102 may be infiltrated with the electrocatalyst by saturating the anode 102 with an electrocatalyst-containing solution. For example, nanoparticles of praseodymium cobalt nitrate suspended in solution may be used to saturate the pores of the anode 102. The nitrate may then be burned off to leave the catalyst finely deposited on the porous surface of the anode 102.

In selected embodiments, the cathode 104 of the electrolyzer cell 100 may also include an electron-conducting phase intermingled with an ion-conducting phase. The electron-conducting phase may, in selected embodiments, include a solid solution of nickel oxide and magnesium oxide. In selected embodiments, the molar ratio of nickel oxide to magnesium oxide is greater than or equal to three.

Upon operating the electrolyzer cell 100, the nickel oxide may be reduced to nickel in the presence of a reducing gas, such as hydrogen, to provide the electronically conducting phase. The magnesium oxide, on the other hand, will remain in oxide form because it is a more stable oxide. This magnesium oxide will remain finely dispersed through the nickel.

The magnesium oxide improves the performance of the cathode 104 by reducing the tendency of the nickel to coarsen over time as it is subjected to high temperatures. Otherwise, very fine particles of nickel will tend to sinter and grow together when subjected to high temperatures. This reduces electrochemical performance at least partly because it reduces the surface area of the nickel. In some cases, the courser nickel particles may pull apart from adjacent particles and lose conductivity therewith. The distribution of magnesium oxide particles through the nickel tends to reduce or at least slow down the coarsening of the nickel, thereby improving electrochemical performance.

The ion-conducting phase of the cathode 104 may also include one or more oxides, such as oxides of zirconia, ceria, or mixtures thereof. For example, the ion-conducting phase may include zirconia doped with one or more of yttrium oxide, ytterbium oxide, calcium oxide, magnesium oxide, scandium oxide, or the like. In other embodiments, the ion-conducting phase may include ceria doped with one or more of samarium oxide, gadolinium oxide, yttrium oxide, ytterbium oxide, calcium oxide, magnesium oxide, scandium oxide, or the like. As mentioned above, ceria may provide better electronic and ionic conductivity than zirconia. The enhanced ionic conductivity and oxygen availability of ceria may be used to further improve the electrochemical performance.

Like the anode 102, the cathode 104 may also be infiltrated with an electrocatalyst such as praseodymium, cobalt, cerium, europium, other rare earth elements, or combinations thereof. This electrocatalyst provides additional activation energy to break the bonds of $H_2O$ and $CO_2$ molecules supplied to the cathode 104, further improving electrochemical performance.

One notable characteristic of the anode and cathode materials described above is that they exhibit significantly improved performance when electrolyzing $CO_2$ to generate CO. With many conventional electrode materials, it has been observed that the kinetics of the $CO_2$ to CO electrolysis reaction are far worse than the kinetics of the $H_2O$ to $H_2$ reaction. Stated otherwise, conventional electrodes exhibit far greater inherent resistance when converting $CO_2$ to CO than they do when converting $H_2O$ to $H_2$. Consequently, a good indicator of the overall performance of electrodes is how well they will convert $CO_2$ to CO. It has been noted that the electrodes 102, 104 described herein exhibit significantly improved electrocatalytic performance for the $CO_2$ to CO reaction when compared to historical electrode materials.

It should be recognized that various different processes and techniques may be used to fabricate the electrolyzer cell 100 and electrodes discussed herein. For example, the electrode materials discussed herein may be used to produce an ink which may be screen printed on the electrolyte layer 106. In other embodiments, the electrodes may be sprayed or tape cast, laminated, and sintered onto the electrolyte layer 106. Thus, electrodes in accordance with the invention are not limited to any one method of fabrication, but rather encompass all processes and techniques used to fabricate electrodes 102, 104 which incorporate the novel materials disclosed herein.

The following paragraphs provide one non-limiting example of a process for producing an electrolyzer cell 100 in accordance with the invention.

EXAMPLES

The material for the anode 102 was produced by initially synthesizing a perovskite composition having a formula of approximately $Pr_{0.8}Sr_{0.2}MnO_{(3-\delta)}$. This composition was synthesized using a liquid nitrate mix process. To produce this composition, stoichiometric proportions of constituent nitrates were mixed and charred over a hot plate at about 150° C. The resulting char was then mixed and calcined at approximately 1000° C. to form a perovskite crystalline phase. The synthesized perovskite powder was then milled in a container with partially stabilized zirconia media to reduce it to appropriate particle size distribution and specific surface area suitable for making screen-printable ink. An ink was then produced using a 50:50 wt percent mixture of praseodymium strontium manganite (PSM) and scandia stabilized zirconia; and a commercial organic vehicle (Heraeus V-006) and terpineol.

The material for the cathode 104 was also synthesized using a liquid nitrate mix process. Specifically, a mixture of nitrates of nickel, magnesium, cerium, and calcium were combined such that the Ni:Mg molar ratio was about 90:10. The final mixture contained about fifty to seventy percent by weight Ni(Mg)O (solid solution of nickel oxide and magnesium oxide) with the remainder being $Ce(Ca)O_{(2-\delta)}$ (ceria doped with calcium oxide). This mixture was then calcined at about 1000° C. and milled to achieve a desired particle size distribution and specific surface area. An ink was then produced using a process similar to that used for the anode 102.

A batch of scandia-doped zirconia (Daiichi, Japan) was tape cast and sintered to provide electrolyte sheets of about 0.18 to 0.20 millimeters thick. The anode and cathode inks were then screen printed on opposite sides of the electrolyte sheet and sintered at about 1300° C. In some cases, the cathode ink was first printed and sintered at about 1400° C. The anode ink was then printed and sintered at a temperature between about 1250° C. and 1300° C.

The above-described process was used to create two different sizes of electrolyzer cells. The first size included button cells containing an electrolyte layer with a diameter of about forty millimeters. The button cells were used primarily for electrode characterization. The second size included square cells measuring about ten centimeters along each edge. The square cells were used primarily for stack evaluation. Platinum mesh was attached to the electrodes of the button cells for current collection. A layer of strontium-doped lanthanum cobaltite ink was printed on the anode 102 and nickel ink was printed on the cathode 104 to provide current collection for the square cells. A stainless steel layer with gas flow passages and cell-to-cell interconnects were then placed in contact with the anode 102 and cathode 104 of the square cells.

Prior to testing the button cells and stacks of square cells, the anodes 102 and cathodes 104 were treated and infiltrated with a catalyst material. This was accomplished by saturating the porous electrodes 102, 104 with a praseodymium cobalt nitrate solution. The molar ratio of praseodymium to cobalt in the solution was approximately one to one. The button cells and stacks of square cells were then heated for testing. In some cases, multiple infiltrations were conducted on the electrodes 102, 104 along with heat treatments at various intermediate temperatures at or around 600° C.

Figure 3:
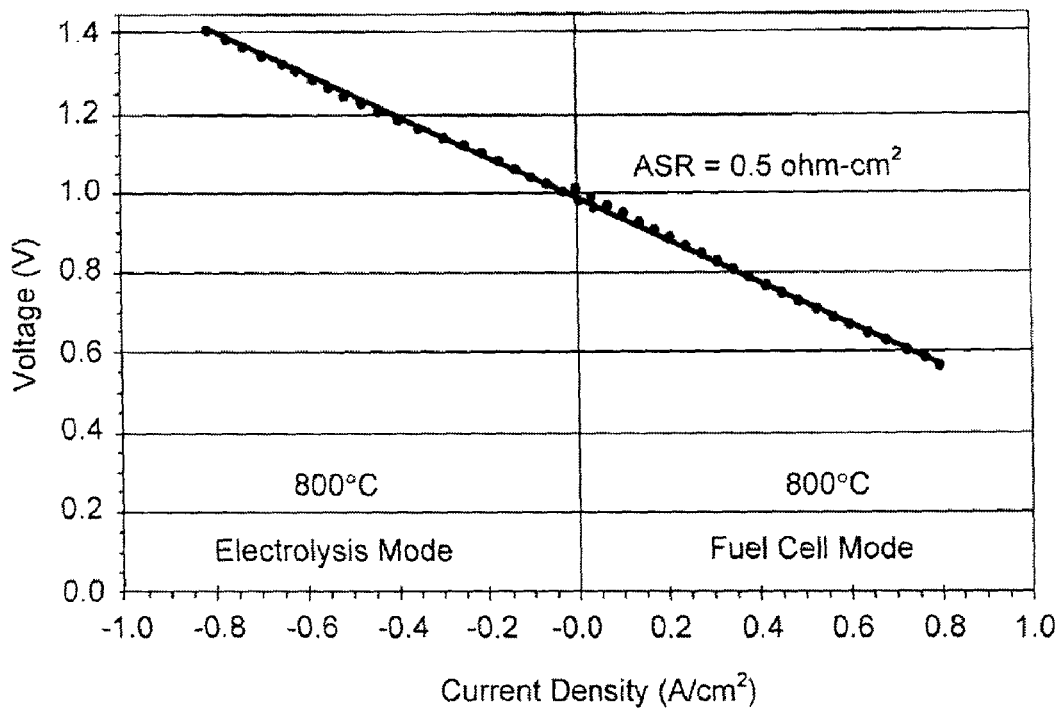
FIG. 3 is a graph showing the current/voltage characteristics of a single button cell, when operated in fuel cell and electrolysis modes.
Figure 4:
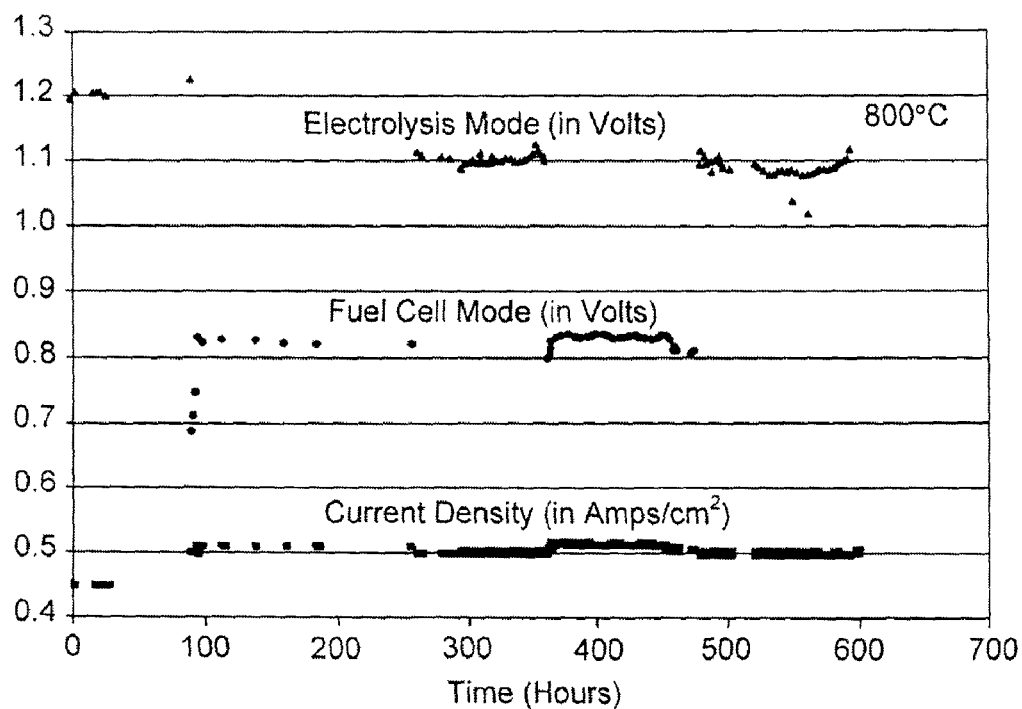
FIG. 4 is a graph showing the long term performance of a single button cell when operated in fuel cell and electrolysis modes.
Figure 5:
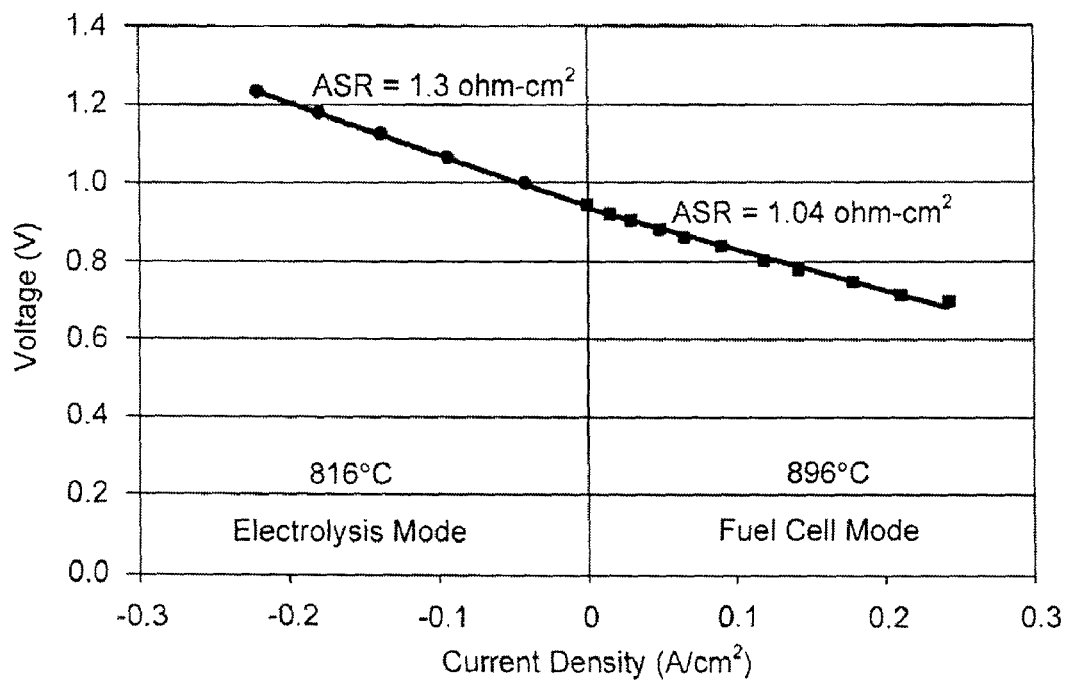
FIG. 5 is a graph showing the current/voltage characteristics of a stack of twenty-five cells when operated in fuel cell and electrolysis modes.
Figure 6:
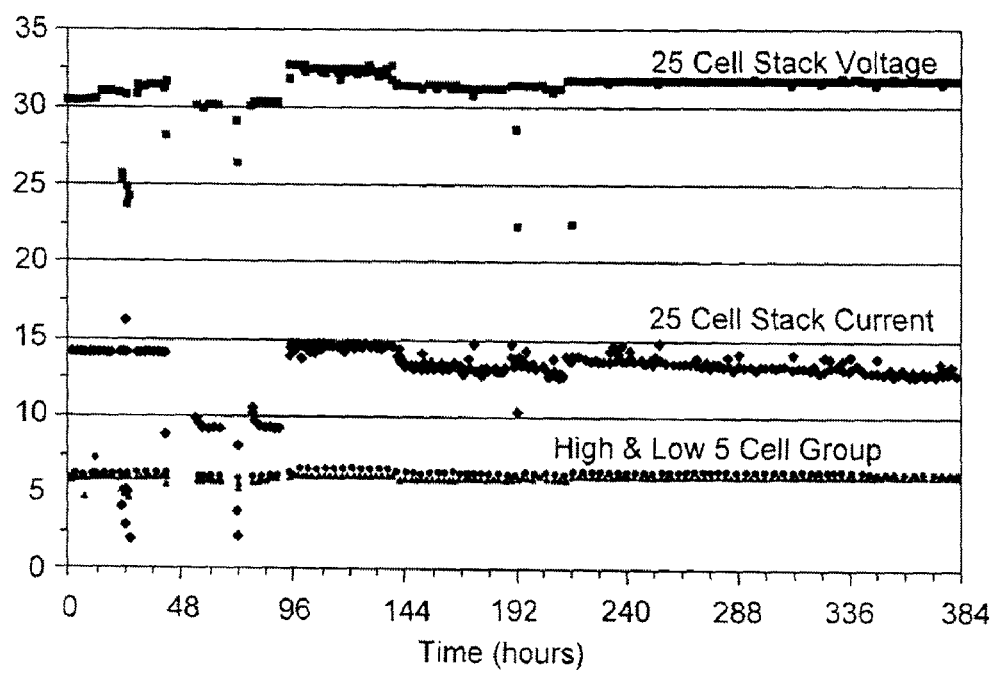
FIG. 6 is a graph showing the long term performance of a stack of twenty-five cells when operated in electrolysis mode.

FIGS. 3 and 4 show the performance of the button cells when operated in fuel cell and electrolysis modes. FIGS. 5 and 6 show the performance of the square cells in twenty-five cell stacks when operated in fuel cell and electrolysis modes.

Referring to FIG. 3, as shown by the graph, the button cell exhibited an area specific resistance (ASR) of approximately 0.5 ohm-cm² in both fuel cell and electrolysis modes, showing the button cell performed equally well in either mode. This resistance was measured while feeding the button cell a mixture containing approximately fifty percent steam and fifty percent hydrogen at an operating temperature of around 800° C. The button cell's small size and environment allowed it to either absorb heat from or radiate heat to its surroundings. Thus, the button cell was substantially isothermal at a temperature of around 800° C. while operating in both fuel cell and electrolysis modes.

Referring to FIG. 4, the long term performance of the button cell was observed over approximately 600 hours of operation. During that period, the button cell was switched between fuel cell and electrolysis modes of operation. As shown by the relationship between cell voltage and current density in both fuel cell and electrolysis modes, the ASR of the cell remained reasonably stable during the approximately 600 hours of operation.

Referring to FIG. 5, as shown by the graph, a stack of twenty-five square cells exhibited an ASR of approximately 1.04 ohm-cm² in fuel cell mode and an ASR of approximately 1.3 ohm-cm² in electrolysis mode. In electrolysis mode, the stack had a core temperature of approximately 816° C. with steam utilization of approximately 49.4 percent. In fuel cell mode, the stack had a core temperature of approximately 896° C. with hydrogen utilization of approximately 72.4 percent. The ratio of hydrogen to steam was approximately 3:4.

The higher ASR of the cell stack compared to the button cell, as demonstrated by FIG. 3, may be attributed to the longer current path and additional components (e.g., interconnects, etc.) that are used to implement the cell stack architecture. Furthermore, the variation in the ASR of the cell stack in fuel cell and electrolysis modes may be attributed primarily to the difference in core operating temperature for each mode, as was described in association with FIG. 2B. That is, the approximately 80° C. difference in the stack core temperature in fuel cell and electrolysis modes causes a significant difference in the measured ASR. Thus, the button cell, as described in association with FIG. 3, may provide a better picture of actual electrode performance since the cell was substantially isothermal in both fuel cell and electrolysis modes.

Referring to FIG. 6, the long term performance of the cell stack was observed over approximately 400 hours of operation. During that period, the cell stack was operated in electrolysis mode. As shown by the relationship between the cell stack voltage and current, the ASR of the cell stack remained reasonably stable during the approximately 400 hours of operation. The cell stack voltage was also monitored and measured for the high and low groups of five cells, as indicated by the lower data points of the graph.

Figure 7:
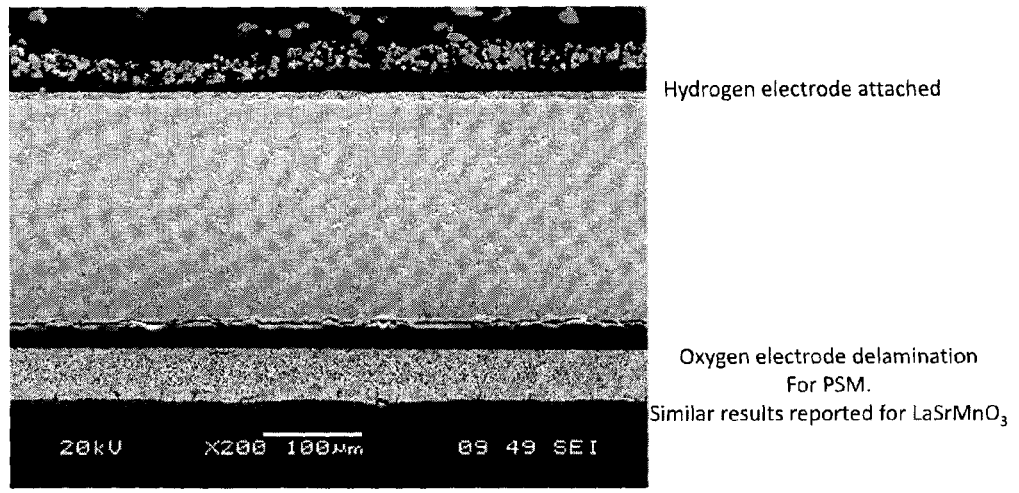
FIG. 7 represents a depiction of an $PrSrMnO_3$ electrode showing the degradation of this electrode after use.

FIG. 7 represents a depiction of the post-test examination results for an electrode made of standard PSM material ($PrSrMnO_3$). As can be seen by this representation, there is noticeable delamination at the oxygen electrode, showing the degradation of performance for this electrode that will occur over time. Similar results are associated with using a $LaSrMnO_3$ electrode.

Figure 8:
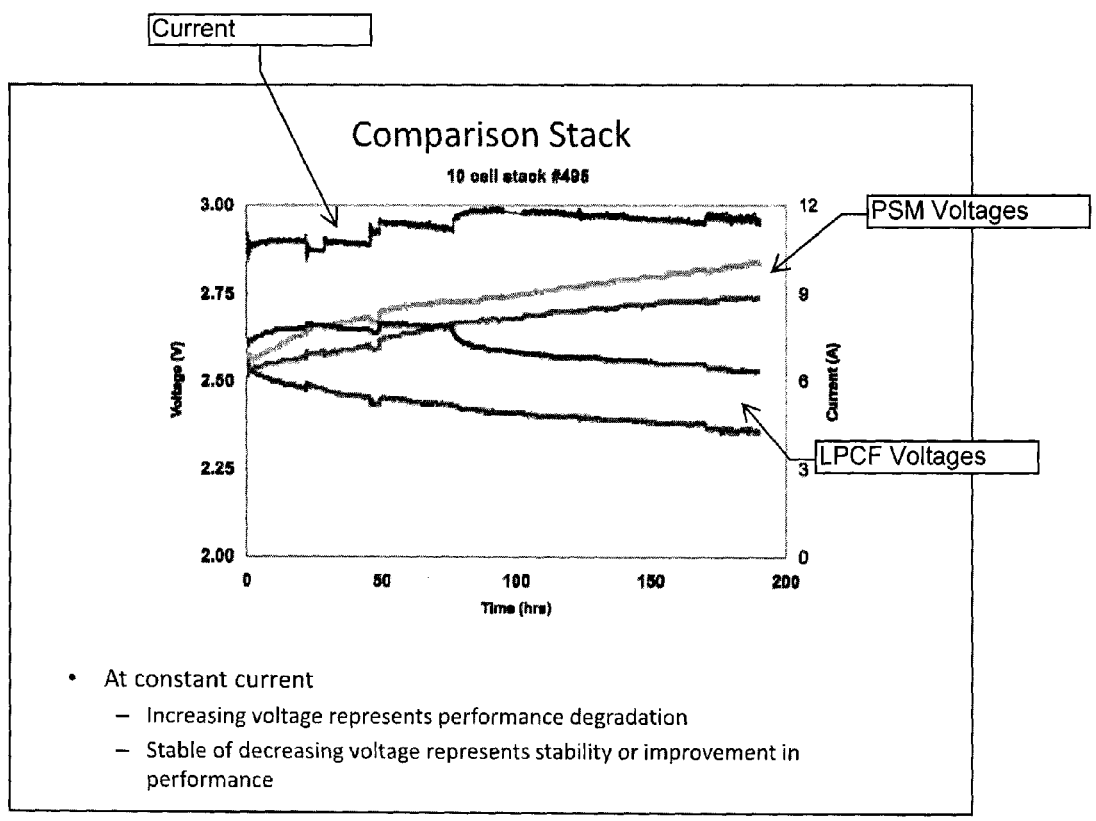
FIG. 8 is a graph showing the long term performance of a stack of ten cells when operated in fuel cell and electrolysis mode, which compares the performance of a $PrSrMnO_3$ electrode compared to an electrode made of $(Pr_{(0.2)}La_{0.8})Co_{0.8}Fe_{0.2}O_{(3-\partial)}$.

FIG. 8 shows a graph comparing the electrodes used in a ten (10) cell stack. Five of the ten cells used a first type of oxygen electrode and the remaining cells used a second type of oxygen electrode. FIG. 8 shows the long term use of these electrodes over a time of 0 to 200 hours. The electrodes may be constructed according to the methods described herein and/or other methods. The current for the stack is shown on the graphs. The performance of two pairs of cells having electrodes made of PSM is shown as having an increasing voltage over time. This increasing voltage indicates degradation of performance over time. Two pairs of cells comprising electrodes of the present embodiments are also shown showing a stable or decreasing voltage over time. This indicates no degradation of the electrode over time. These electrodes are made of a LPCF material, which has the formula $(Pr_{(0.2)}La_{0.8})Co_{0.8}Fe_{0.2}O_{(3-\partial)}$, mixed with 50 wt % samaria doped ceria. A 15-20 μm layer of samaria doped ceria was also sintered onto the electrolyte prior to screen printing the LPCF electrode. The ceria interlayer prevents reaction between lanthanum and zirconia.

Figure 9:
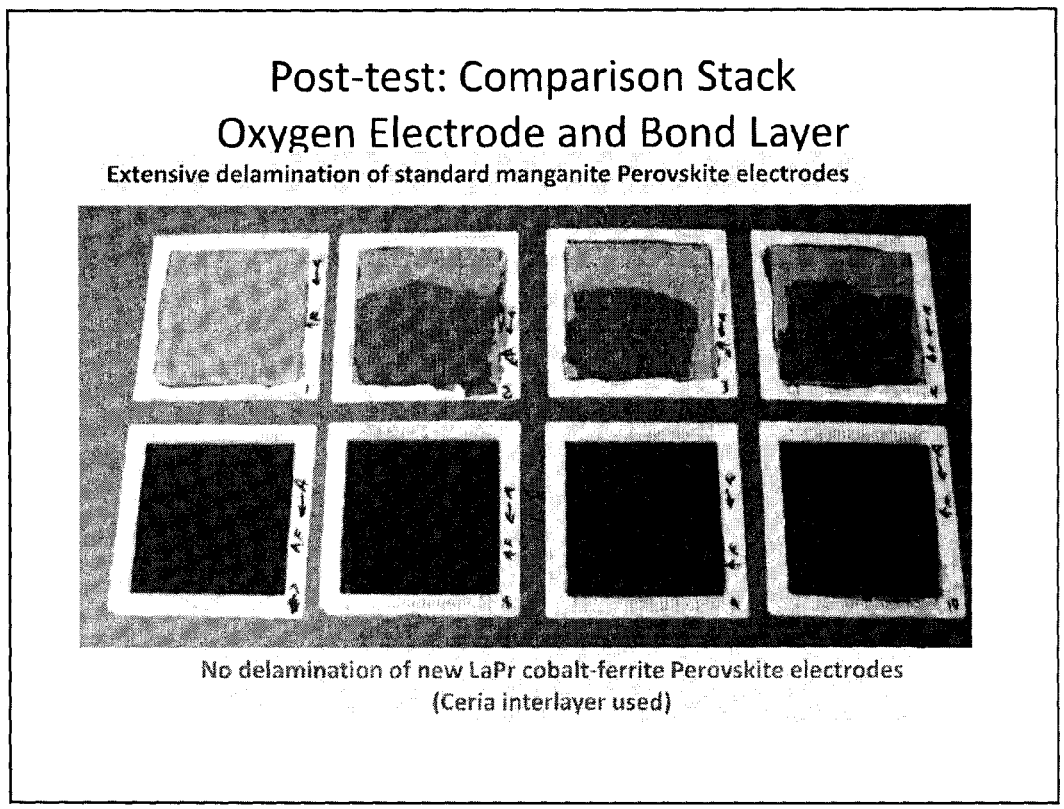
FIG. 9 is an examination of the delamination (degradation) of two different types of electrodes, one made of $PrSrMnO_3$ and the other made of $(Pr_{0.2})La_{0.8})Co_{0.8}Fe_{0.2}O_{(3-\partial)}$.

FIG. 9 shows a picture of the degradation of a stack comprising a standard PSM oxygen electrode (and the corresponding bond layer) compared to a stack using a LPCF electrode according to the present embodiments. The amount of degradation of the LPCF electrode, as shown in FIG. 9, is significantly reduced.

Figure 10:
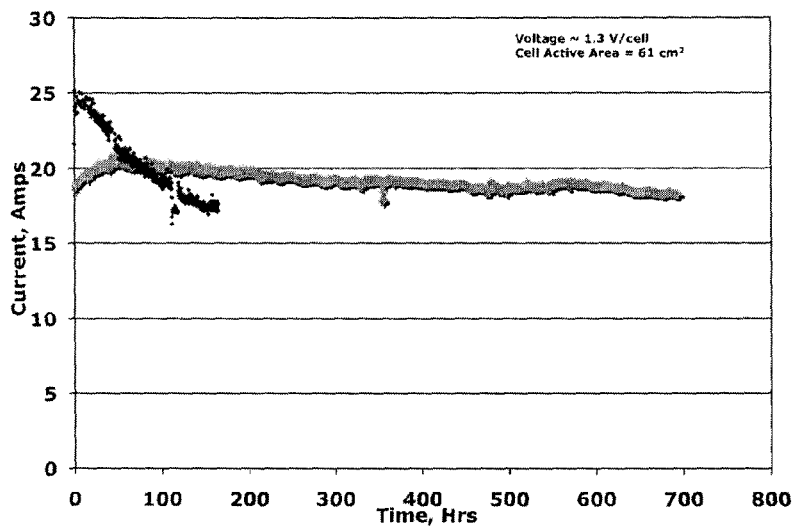
FIG. 10 is a graph of the long term stability of a $PrSrMnO_3$ electrode and a $(Pr_{(0.2)}La_{0.8})Co_{0.8}Fe_{0.2}O_{(3-\partial)}$ electrode.

FIG. 10 shows a graph of the long term stability of a PSM electrode versus a LPCF electrode according to the present embodiments. The LPCF electrode has been used for 700 hours and shows a decreasing current, suggesting that limited degradation is occurring at the electrode. The PSM electrode was only usable for about 200 hours, thus indicating the long-term stability of a LPCF electrode is greater than that of a PSM electrode.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electrolyzer cell comprising:
   a cathode to reduce an oxygen-containing molecule to produce an oxygen ion and a fuel molecule;
   an electrolyte coupled to the cathode to transport the oxygen ion;
   an anode coupled to the electrolyte to receive the oxygen ion to produce oxygen gas therewith, the anode comprising an electron-conducting phase comprising a perovskite having a chemical formula of substantially $(Pr_{(1-x)}D_x)_{(z-y)}A'_yBO_{(3-\partial)}$, wherein $0<x<1$, $0 \leq y \leq 0.5$, $0.8 \leq z \leq 1.1$, D is selected from the group consisting of La, Ba, and a La—Ba mixture, A' is an alkaline earth metal, and B is a transition metal; and
   wherein the anode further comprises an ion-conducting phase comprising an oxide.

2. The electrolyzer cell of claim 1, wherein the oxide comprises zirconia doped with at least one of yttrium oxide, ytterbium oxide, calcium oxide, magnesium oxide, scandium oxide, and cerium oxide.

3. The electrolyzer cell of claim 1, wherein the oxide comprises ceria doped with at least one of yttrium oxide, ytterbium oxide, calcium oxide, magnesium oxide, scandium oxide, and zirconium oxide.

4. The electrolyzer cell of claim 1, wherein the anode is porous, the porosity thereof being infiltrated with an electrocatalyst.

5. The electrolyzer cell of claim 4, wherein the electrocatalyst comprises at least one of praseodymium, cobalt, cerium, europium, and other rare earth elements.

6. The electrolyzer cell of claim 1, wherein the alkaline earth metal comprises at least one of calcium and strontium.

7. The electrolyzer cell of claim 6, wherein the alkaline earth metal comprises calcium.

8. The electrolyzer cell of claim 1, wherein the transition metal comprises at least one of manganese, cobalt, and iron.

9. The electrolyzer cell of claim 1, wherein the cathode comprises an electron-conducting phase comprising at least one of nickel oxide and magnesium oxide.

10. The electrolyzer cell of claim 1, wherein y is zero such that there is no A' composition in the perovskite.

11. The electrolyzer cell of claim 1, wherein D is La.

12. The electrolyzer cell of claim 1, wherein D is Ba.

13. The electrolyzer cell of claim 1, wherein the perovskite has the formula $(Pr_{(0.2)}La_{0.8})Co_{0.8}Fe_{0.2}O_{(3-\partial)}$.

14. An electrolyzer cell comprising:
a cathode to reduce an oxygen-containing molecule to produce an oxygen ion and a fuel molecule;
an electrolyte coupled to the cathode to transport the oxygen ion;
an anode coupled to the electrolyte to receive the oxygen ion to produce oxygen gas therewith, the anode comprising an electron-conducting phase comprising a perovskite having a chemical formula of substantially $(Pr_{(1-x)}La_x)_{(z-y)}A'_yBO_{(3-\partial)}$, wherein $0 \leq x \leq 1$, $0 \leq y \leq 0.5$, $0.8 \leq z \leq 1.1$, A' is an alkaline earth metal, and B is a transition metal; and
wherein the anode further comprises an ion-conducting phase comprising an oxide.

15. The electrolyzer cell of claim 14, wherein y is zero such that there is no A' composition in the perovskite.

16. The electrolyzer cell of claim 14, wherein the oxide comprises zirconia doped with at least one of yttrium oxide, ytterbium oxide, calcium oxide, magnesium oxide, scandium oxide, and cerium oxide.

17. The electrolyzer cell of claim 14, wherein the oxide comprises ceria doped with at least one of yttrium oxide, ytterbium oxide, calcium oxide, magnesium oxide, scandium oxide, and zirconium oxide.

18. The electrolyzer cell of claim 14, wherein the anode is porous, the porosity thereof being infiltrated with an electrocatalyst.

19. The electrolyzer cell of claim 16, wherein the electrocatalyst comprises at least one of praseodymium, cobalt, cerium, europium, and other rare earth elements.

20. The electrolyzer cell of claim 14, wherein the cathode comprises an electron-conducting phase comprising at least one of nickel oxide and magnesium oxide.

21. The electrolyzer cell of claim 14, wherein the alkaline earth metal comprises at least one of calcium and strontium.

22. The electrolyzer cell of claim 14, wherein the transition metal comprises at least one of manganese, cobalt, and iron.

23. An electrolyzer cell comprising:
a cathode to reduce an oxygen-containing molecule to produce an oxygen ion and a fuel molecule, the cathode comprising an electron conducting phase comprising at least one of nickel oxide and magnesium oxide;
an electrolyte coupled to the cathode to transport the oxygen ion;
an anode coupled to the electrolyte to receive the oxygen ion to produce oxygen gas therewith, the anode comprising an electron-conducting phase comprising a perovskite having a chemical formula of substantially $(Pr_{(1-x)}La_x)_{(z-y)}A'_yBO_{(3-\partial)}$, wherein $0 \leq x \leq 1$, $0 \leq y \leq 0.5$, $0.8 \leq z \leq 1.1$, A' is an alkaline earth metal, and B is a transition metal; and
wherein the anode further comprises an ion-conducting phase comprising ceria doped with at least one of yttrium oxide, ytterbium oxide, calcium oxide, magnesium oxide, scandium oxide, and zirconium oxide.

24. The electrolyzer cell of claim 23, wherein the alkaline earth metal comprises strontium.

25. The electrolyzer cell of claim 24, wherein the transition metal comprises at cobalt and iron.

* * * * *